(12) United States Patent  
Federl et al.

(10) Patent No.: US 9,546,019 B2  
(45) Date of Patent: Jan. 17, 2017

(54) PALLET AND METHODS OF MAKING AND USING THE SAME

(71) Applicant: SABIC Innovative Plastics IP B.V., Bergen op Zoom (NL)

(72) Inventors: Alan Robert Federl, Dana Point, CA (US); Ralph Robert Buoniconti, West Springfield, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 219 days.

(21) Appl. No.: 13/692,239

(22) Filed: Dec. 3, 2012

(65) Prior Publication Data

US 2013/0145971 A1  Jun. 13, 2013

Related U.S. Application Data

(60) Provisional application No. 61/567,923, filed on Dec. 7, 2011.

(51) Int. Cl.
| | | |
|---|---|---|
| *B65D 19/38* | (2006.01) | |
| *B65D 19/00* | (2006.01) | |
| *C08L 79/08* | (2006.01) | |
| *C08G 73/16* | (2006.01) | |

(52) U.S. Cl.
CPC .......... *B65D 19/0059* (2013.01); *B65D 19/38* (2013.01); *B65D 2203/10* (2013.01); *B65D 2213/00* (2013.01); *B65D 2519/00024* (2013.01); *B65D 2519/00034* (2013.01); *B65D 2519/00039* (2013.01); *B65D 2519/00044* (2013.01); *B65D 2519/0086* (2013.01); *B65D 2519/00273* (2013.01); *B65D 2519/00293* (2013.01); *B65D 2519/00303* (2013.01); *B65D 2519/00318* (2013.01); *B65D 2519/00343* (2013.01); *C08G 73/16* (2013.01); *C08L 79/08* (2013.01)

(58) Field of Classification Search
CPC ..................... B65D 19/0012; B65D 19/0026
USPC ................................. 312/57.25, 57.17, 57.3
See application file for complete search history.

(56) References Cited

U.S. PATENT DOCUMENTS

| | | |
|---|---|---|
| 6,745,703 B2 | 6/2004 | Torrey et al. |
| 6,758,148 B2 | 7/2004 | Torrey et al. |
| 6,784,234 B2 | 8/2004 | Adedeji et al. |
| 7,086,340 B2 | 8/2006 | Apps |
| 7,244,501 B2 * | 7/2007 | Raghavendran .............. 428/412 |

(Continued)

OTHER PUBLICATIONS

International Search Report for International Application No. PCT/US2012/067571; International Filing Date Dec. 3, 2012; Mailed Feb. 20, 2013; 5 pages.

(Continued)

*Primary Examiner* — Leslie A Nicholson, III  
*Assistant Examiner* — Andres Gallego  
(74) *Attorney, Agent, or Firm* — Cantor Colburn LLP

(57) ABSTRACT

In one embodiment, a pallet comprises a top deck comprising a substrate having a first surface and a second surface, wherein the substrate comprises a first plastic material; and a layer disposed on the second surface of the substrate, wherein the layer comprises a composition comprising reinforcing fibers, polyimide fibers, and polymeric binder fibers, wherein the polymeric binder fibers have a melting point that is lower than the polyimide fibers; a bottom deck; and supporting columns disposed between the second surface and the bottom deck.

17 Claims, 1 Drawing Sheet

(56) References Cited

U.S. PATENT DOCUMENTS

| | | |
|---|---|---|
| 7,273,014 B2 | 9/2007 | Adedeji et al. |
| 7,789,024 B2 * | 9/2010 | Muirhead .................. 108/51.11 |
| 2001/0044017 A1 * | 11/2001 | Nakajima .......... G03G 15/2025 428/294.7 |
| 2002/0030597 A1 | 3/2002 | Muirhead |
| 2004/0059035 A1 | 3/2004 | Krech et al. |
| 2005/0004281 A1 | 1/2005 | Adedeji et al. |
| 2005/0103236 A1 * | 5/2005 | Apps ....................... B29C 65/02 108/56.3 |
| 2006/0081158 A1 | 4/2006 | Ingham |
| 2007/0123132 A1 * | 5/2007 | Erb .......................... B32B 5/02 442/415 |
| 2008/0314010 A1 * | 12/2008 | Smithies et al. ................ 55/498 |
| 2010/0233523 A1 * | 9/2010 | Jo et al. ....................... 429/144 |
| 2012/0065283 A1 | 3/2012 | Adjei et al. |

OTHER PUBLICATIONS

Written Opinion for International Application No. PCT/US2012/067571; International Filing Date Dec. 3, 2012; Mailed Feb. 20, 2013; 8 pages.

* cited by examiner

PALLET AND METHODS OF MAKING AND USING THE SAME

CROSS REFERENCE TO RELATED APPLICATIONS

The present application claims priority to U.S. Provisional Patent Application No. 61/567,923 filed Dec. 7, 2011, which is hereby incorporated by reference in its entirety.

TECHNICAL FIELD

The present disclosure relates generally to pallets, in particular, pallet systems, methods of making, and uses thereof.

BACKGROUND

There are many types of pallets, which are used throughout the world to facilitate shipment and transportation of goods. The purpose of the pallet is to provide support for cargo particularly during shipment and storage. There has been an increasing requirement for such pallets to become more sophisticated due to varying standards and demands. Pallets can be formed from timber (i.e., wood), but these pallets suffer from several disadvantages because of the inherent characteristics of wood. For example, wooden pallets are naturally heavy, bulky, and can be expensive because of the nature of the material used in their construction. In addition, wooden pallets suffer deterioration due to inclement weather conditions and can suffer damage from water that may be present in the location in which the pallets are being used.

The presence of water can result in decomposition of the wood and resultant weakening of the structure of the pallet. Furthermore, wooden pallets are generally held together with the use of glue, adhesives, and/or metal nails or staples. These fixation methods can also suffer as a result of the inclement conditions the pallet may be subjected to and are manifested by deterioration of the adhesive and/or corrosion of the nails or staples. Wooden pallets can also be subjected to insect infestation, which can also result in deterioration of the pallet and can transmit undesirable insect infestations from one location to another. Many countries (e.g., United States, Australia, Canada, New Zealand, and China) require wooden pallets to be certified pest free, which means that the pallets have to undergo a process, e.g., heat treatment or fumigation, in order to be certified pest free.

Plastic pallets can be used as an alternative to wooden pallets, due to their moisture resistance, toughness, and flexibility in design through injection molding, structural foam, and extrusion/thermoforming processes not available in wooden pallets. However there can be concerns regarding the fire properties of plastic pallets. With fire control infrastructure (e.g., sprinkler systems) designed around wooden pallets, a challenge arises to ensure plastic pallets perform satisfactorily to meet the large-scale burn standards, e.g., UL 2335 (Second Edition, Jul. 28, 2010). Without the proper pallet design and construction materials, plastic pallets could fail due to molten plastic flow during fires, spreading burning material, and could generate levels of heat beyond their wooden counterparts, resulting in conditions that can overwhelm sprinkler systems' ability to control a fire. Because of these risks, the use and storage of plastic pallets which do not meet large-scale burn standards can be challenging. A desired feature of pallets is that the pallets do not spread flames from one pallet to another in the case of a fire during use or storage of the pallets. The use of flame retardant additives compounded into a plastic resin has been the primary solution to retarding flame spread and fire growth, but the drawbacks can be considerable, including loss of material mechanical properties, loss of toughness, and environmentally unfriendly flame retardant additive systems (for example, non-restriction on hazardous substances (ROHS) compliant Halogen additives) Thus, there is a need for environmentally friendly pallets with flame retarding and resisting properties and also a continual need for an improvement in the design and use of plastic pallets.

BRIEF SUMMARY

Disclosed, in various embodiments, are pallet assemblies, methods of making pallet assemblies, and uses of pallet assemblies.

In one embodiment, a pallet comprises: a top deck comprising a substrate having a first surface and a second surface, wherein the substrate comprises a first plastic material; and a layer disposed on the second surface of the substrate, wherein the layer comprises a composition comprising reinforcing fibers, a polyimide fibers, and polymeric binder fibers, wherein the polymeric binder fibers have a melting point that is lower than the polyimide fibers; a bottom deck; and supporting columns disposed between the second surface and the bottom deck.

In another embodiment, a pallet comprises: a top deck comprising a multiwall sheet, wherein the multiwall sheet comprises a first wall, a second wall, and ribs disposed between the first wall and the second wall, wherein the first wall and ribs comprise a first plastic material and wherein the second wall comprises a matrix layer comprising a dual matrix composite comprising a first matrix, a second matrix, and a network of fibers, wherein the network of fibers comprises polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers; a bottom deck; and supporting columns disposed between the second wall and the bottom deck.

In another embodiment, a method of making a pallet comprises: forming a top deck comprising a multiwall sheet, wherein the multiwall sheet comprises a first wall, a second wall, and ribs disposed between the first wall and the second wall, wherein the first wall and ribs comprise a first plastic material and wherein the second wall comprises a matrix layer comprising a dual matrix composite comprising a first matrix, a second matrix, and a network of fibers, wherein the network of fibers comprise polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers; forming a bottom deck; forming supporting columns between the second wall and the bottom deck.

In still another embodiment, a method of making a pallet comprises: forming a pallet comprising a top deck comprising a multiwall sheet, wherein the multiwall sheet comprises a first wall, a second wall, and ribs disposed between the first wall and the second wall, wherein the first wall and ribs comprise a first plastic material and wherein the second wall comprises a matrix layer comprising a composition comprising reinforcing fibers, polyimide fibers, and polymeric binder fibers, wherein the polymeric binder fibers have a melt temperature lower than the polyimide fibers; a bottom deck; and supporting columns disposed between the second wall and the bottom deck; and embedding a radio frequency identification tag in the top deck.

In yet another embodiment, a pallet comprises: a top deck comprising a substrate having a first surface and a second surface; and wherein the top deck comprises a deck material selected from the group consisting of metal, wood, plastic, and combinations comprising at least one of the foregoing; a bottom deck; and supporting columns disposed between the second surface and the bottom deck; wherein the pallet passes the idle test and the commodities test as set forth in UL 2335 (Second Edition, Jul. 28, 2010).

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
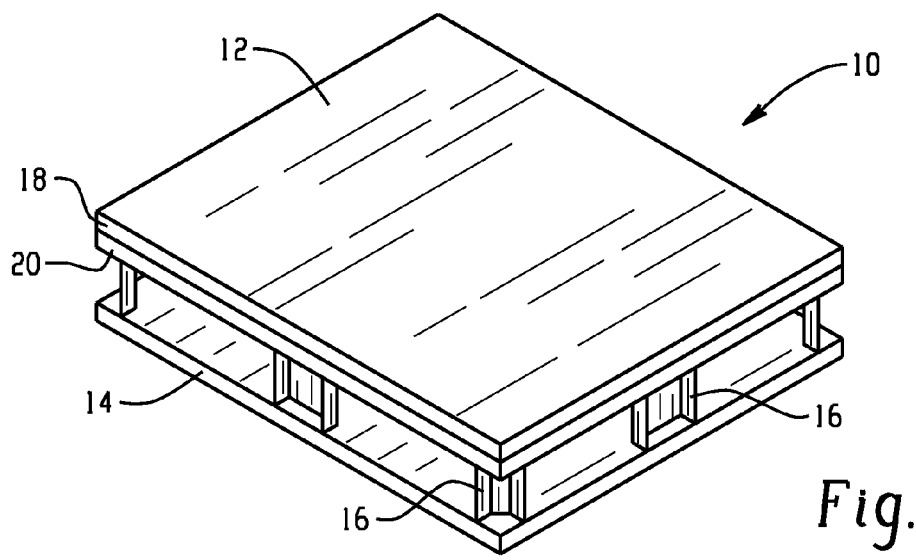
FIG. 1 is a perspective view of a pallet with a top deck comprising a substrate and a layer.

Disclosed herein, in various embodiments, are pallets incorporating a fire retarding (e.g., fire resisting) and/or fire growth barrier that enables the pallets to pass the large-scale burn tests in the standard set forth by UL 2335 (Second Edition, Jul. 28, 2010) (Second Edition, Jul. 28, 2010). Also included are industry pallets comprising the barrier in various locations of the pallet to provide fire retardance and inhibit fire growth. The fire retarding barrier disclosed herein can be designed in various configurations to help prevent the spread of flame and fire growth. For example, the barrier can be configured to be the top deck of pallet and/or can be configured to be a barrier layer ("the shield") located between the top and bottom decks of the pallet. The top deck or shield (i.e., layer or second wall) can comprise a material that allows the pallet to meet ASTM E84-07b and/or which retards fire propagation, as seen in Cone calorimetry Heat Release performance according to ASTM E1354 and also allows the pallet to pass the idle test and the commodities test as set forth in UL 2335 (Second Edition, Jul. 28, 2010). Some possible materials include metal (e.g., aluminum, steel, and so forth), wood (e.g., oak, maple, cedar, ash, pine, particle board and so forth), plastic (e.g., thermoplastic, thermoset, and so forth), and combinations comprising at least one of the foregoing materials.

Examples of possible plastic materials include polyetherimides (e.g., ULTEM* commercially available from SABIC's Innovative Plastics business), polycarbonate (e.g., polycarbonate comprising a flame retardant additive ("FR PC", e.g., LEXAN*, commercially available from SABIC's Innovative Plastics business)), acrylonitrile-butadiene-styrene (ABS) thermoplastics (e.g., CYCOLAC* and/or CYCOLOY*, both commercially available from SABIC's Innovative Plastics business;), acrylic-styrene-acrylonitrile (ASA) thermoplastics (e.g., GELOY* commercially available from SABIC's Innovative Plastics business), polypropylene, polyphenylene oxide (e.g., a polyphenylene oxide-polystyrene blend, e.g., NORYL*, commercially available from SABIC's Innovative Plastics business), polyurethane, polyester (e.g., polybutylene terephthalate (PBT), polyethylene terephthalate (PET), and blends therewith such as VALOX* and XENOY*, both commercially available from SABIC's Innovative Plastics business), and combinations comprising at least one of the foregoing.

A specific example of a shield is a dual matrix composite ("Composite Board", such as ULTEM* composite aerospace board (CAB) sheets commercially available from SABIC'S Innovative Plastics business). Use of these materials in either the top deck or the shield design creates a modified pallet system that offers the benefit of separating the overall functioning of the pallet into a well-defined fire retarding shield, or top deck, and the remainder of the pallet (top deck and bottom deck, or just the bottom deck), which can perform the function of durability, chemical resistance, strength and stiffness. In other words, the pallet can comprise a shield (such as located on a side of the top deck adjacent the bottom deck) that enables the pallet to meet ASTM E84-07b, without the remainder of the pallet having undesirable flame retardant additives. For example, while still meeting ASTM E84-07b, the whole pallet (including the shield) can be free of polybrominated diphenyl ether (e.g., free of decabromodiphenyl ether), and in some embodiments, the remainder of the pallet (e.g., the pallet other than the shield) can be free of flame retardant additives.

Pallets generally comprise a top deck, a bottom deck, and supporting columns disposed between the top deck and the bottom deck. A portion of the top deck (e.g., a shield, a layer and/or a wall of a multiwall sheet) can comprise a dual matrix composite material or can comprise a plastic material comprising a flame retardant additive, both of which serve to inhibit the spread of flames and inhibit fire growth among the pallet surfaces. When referring to the shield (i.e. layer, wall, etc.), it is to be understood that the shield covers a major portion of the surface to which it is attached. For example, the shield can be dispersed across (e.g., extend across) greater than or equal to 80% of the surface to which it is attached (e.g., the second surface), specifically, greater than or equal to 85%, more specifically, greater than or equal to 90%, and even more specifically, greater than or equal to 95%.

The inhibiting of the spread of flames will also work to reduce the rate of growth of a fire, allowing sprinkler systems time to activate and control the fire. Plastic pallets offer several advantages over wooden pallets, since they do not need to be treated for pests, are weather resistant, are durable, can be manufactured in complex shapes with multiple features, and are stackable for space utilization, can be recycled and/or replaced and/or repaired relatively easily, and can be easily colored for identification purposes. Pallets, in order to function effectively, should be able to support a load placed upon them and resist deformation under load. The pallet should also be able to function for the duration of carrying the load (e.g., for one way or multi-use pallets) and should be able to function for the duration of multiple trips carrying a load (e.g., for multi-use pallets) without degradation of the desired pallet properties. Pallets should also be compatible with the packaging material of the loads carried and be flame retarding. The pallets disclosed herein can offer a desirable balance of these properties by using, in some embodiments, e.g., a Composite Board material in various locations of the pallets as described herein to inhibit fire growth and spread of flames (e.g., little or no flame spread along certain surfaces of the pallet when exposed to flames)

without an adverse environmental impact (e.g., without the use of flame retardant additives that can be harmful to the environment).

As described herein, the composite board material, as described in commonly assigned co-pending U.S. patent application Ser. No. 13/232,577, which is incorporated by reference herein, can comprise fiber reinforcement, a first matrix formed from polymeric binder fibers, and a second matrix formed from polyimide fibers. More specifically, the Composite Board can comprise a dual matrix composite material comprising reinforcing fibers, polyimide fibers, and polymer binder fibers, wherein the polymer binder fibers have a melting point less than the polyimide fibers. The dual matrix composite can comprise a first matrix, a second matrix, and a network of fibers, wherein the network of fibers comprises reinforcing fibers. The first matrix can comprise melted and cooled polymeric binder and the second matrix can comprise melted and cooled polyimide. The polymeric binder has a melt temperature lower than the polyimide fibers so that a porous mat and the first matrix are formed by heating the reinforcing fibers, polyimide fibers, and polymeric binder fibers at a temperature sufficient to melt the polymeric binder fibers but not the polyimide fibers. After the porous mat and first matrix have been formed, the porous mat is consolidated by heating, under compression to a temperature that will melt the polyimide fibers, thus forming the second matrix of the dual matrix composite. Use of the combination of the three fibrous components allows uniform mixing and distribution of the components in the porous mat. The components of the porous mat are also sufficiently stable to survive repeated heating to processing or forming temperatures with minimal oxidation. The properties and composition of the porous mat can be varied according to the desired need, for example, by varying the type, dimensions, and amount of reinforcing fiber and polymeric binder.

Generally, there are two types of pallets, block pallets and stringer pallets. Stringer pallets generally comprise wood with two inch by four inch by 48 inch long studs in a horizontal mode with the four inch dimension being perpendicular to the top of the pallet. Slats or stringers (e.g., supporting columns) are generally sandwiched between the top deck and the bottom deck. The stringers can be notched to allow for a partial four way pallet jack entry (i.e., a four way stringer pallet). If the stringers are not notched, it is called a two way pallet with fork lift or pallet jack entry from either end. The bottom deck can be chamfered to allow entry for the wheels of a pallet jack. In an alternative embodiment, the stringer pallet can comprise a top deck and supporting columns, which is typically called a skid.

Block pallets generally comprise blocks (e.g., supporting columns) between top and bottom decks. Block pallets are generally known as true four way entry pallets, since a pallet jack can be used from any side to move it. Block pallets generally use four to twelve blocks to support the top deck. Alternatively, a block pallet can comprise a top deck and supporting columns, without the presence of a bottom deck. The surfaces of the top deck and/or the bottom deck can be solid or can contain openings or holes located therein. In embodiments where both the top deck and the bottom deck are present, both the top deck and the bottom deck can, optionally, contain openings or holes in the decks. It can be desirable for the tock deck to contain openings that allow a substance to penetrate down a stack of pallets (e.g., water from a sprinkler system). For example, the top deck and/or the bottom deck can contain channels (e.g., along the perimeter of the decks) where the channels can be closed to capture liquids or can extend through the top deck and/or the bottom deck to allow undesired material present on the decks (e.g., liquid from rain, leaking containers, etc. or any other spilled material) to drain or be expelled from the pallet.

The outermost surface of the top deck of the pallet (e.g., first surface) can have a smooth surface (i.e., not rough) and/or can have a non-skid (e.g., roughened) surface. The non-skid surface can, for example, aid in the prevention of the load from slipping off the pallet. For example, a portion of the top deck can have a smooth surface (e.g., near the edges of the top deck) and a portion of the top deck can have a non-skid surface (e.g., near the middle of the top deck). The locations of the smooth and non-skid surfaces can vary depending on the loads that will be placed on the pallet. The non-skid surface can comprise a coating on a portion of the top deck (e.g., an anti-slip coating, such as a rubberized coating), and/or an insert (e.g., a rubber insert) placed in strategic locations throughout the surface of the top deck, and/or a textured surface (e.g., texturing or surface roughness imparted to the surface of the top deck during processing) having an average surface roughness sufficient to prevent slippage of the loads placed on the pallet.

The Grocery Manufacturing Association is one group that sets forth specifications for pallets. For example, the Grocery Manufacturing Association specifications for a pallet are that it measures 48 inches by 40 inches (1,219 millimeters (mm) by 1,016 mm); that it accommodate pallet jacks; that it have a flat, top load bearing surface with at least 85% coverage; that it have a bottom loading surface and have cut outs for pallet jack wheels from four sides (i.e., a four way entry); that it be rackable (e.g., stackable) from both the 48 inch and the 40 inch dimension; should be recyclable; that it have a desired weight of under 50 pounds; that it have a load bearing capacity of at least 2,800 pounds (1,270 kilograms (kg)); and that it be weather and moisture resistant. There are a multitude of possible measurements for pallet. Other possible pallet measurements are listed in Table 1, but it is to be understood that the pallets disclosed herein are not limited to the measurements listed in Table 1.

TABLE 1

Possible Pallet Measurements

| Dimensions (mm); Width by Length | Dimensions (inches); Width by Length |
|---|---|
| 1,000 by 1,200 | 39 by 47 |
| 1,165 by 1,165 | 46 by 46 |
| 1,100 by 1,100 | 43 by 43 |
| 800 by 1,200 | 32 by 47 |
| 1,067 by 1,067 | 42 by 42 |
| 1,219 by 1,219 | 48 by 48 |
| 1,016 by 1,219 | 40 by 48 |
| 1,219 by 1,067 | 48 by 42 |
| 1,016 by 1,016 | 40 by 40 |
| 1,219 by 1,143 | 48 by 45 |
| 1,118 by 1,118 | 48 by 44 |
| 914 by 914 | 36 by 36 |
| 1,219 by 914 | 48 by 36 |
| 889 by 1,156 | 35 by 45.5 |
| 1,219 by 508 | 48 by 20 |

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
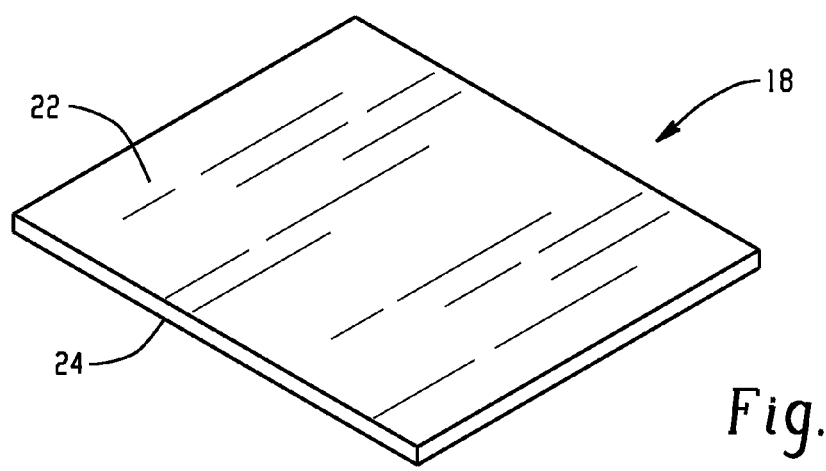
FIG. 2 is a perspective view of the substrate of the pallet of FIG. 1.
Figure 3:
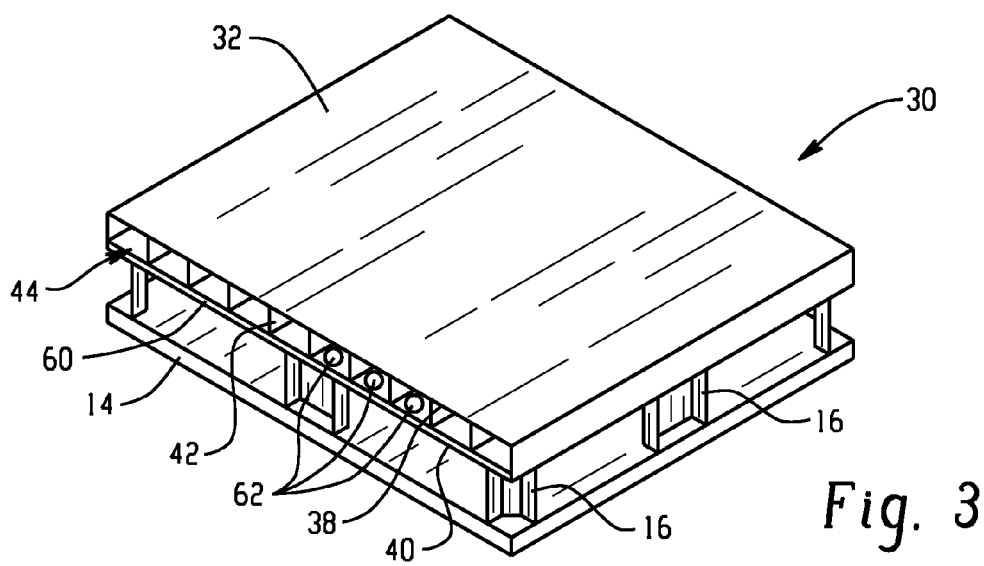
FIG. 3 is a perspective view of a pallet with a top deck comprising a multiwall sheet.

FIGS. 1, 2, and 3 illustrate various designs for a pallet 10, 30. For example, FIG. 1 illustrates a pallet 10 comprising a top deck 12, a bottom deck 14, and supporting columns 16. In FIG. 1 a top deck 12 can comprise a substrate 18 and a layer 20, where the supporting columns 16 can be disposed between the layer 20 and the bottom deck 14. The bottom deck 14 is an optional component of the pallet. For example, a pallet 10 can comprise a top deck 12 and supporting columns 16. The design and amount of supporting columns 16 is dependent upon the particular pallet design. Generally, columns 16 are located to provide structural integrity to the top deck 12 while allowing a pallet jack (e.g., a fork lift prong) access. In many embodiments, the columns 16 are located at least at each corner. Additional columns 16 between each corner (e.g., along the side, about half way between the corners), and/or in the middle of the pallet, are often employed.

Turning now to FIG. 3, another pallet 30 is illustrated. As illustrated in FIG. 3, a pallet 30 can comprise a top deck 32, a bottom deck 14, and supporting columns 16. The top deck 32 can comprise a multiwall sheet 44 comprising a first wall 38, a second wall 40, and ribs 42 disposed between the first wall 38 and the second wall 40. Generally, the first wall 38 can be one of the external surfaces of the pallet 30. It is to be understood that ribs located between the first wall 38 and the second wall 40 not along the perimeter (i.e., edge) of the multiwall sheet 44 are optional and are included for illustration purposes only. The second wall 40 can further include a plastic layer 60 located on a side of the second wall 40 adjacent the ribs 42.

Optionally, a radio frequency identification (RFID) tag 62 can be located in an open space located between the first wall 38 and the second wall 40. RFID tags can transmit data about the pallet (e.g., location) to the owner of the pallet for tracking, payment purposes, etc. RFID tags can generally be active, semi-passive, or passive, can store up to 2 kilobytes of data, and can be composed of a microchip, antenna, and a battery in the case of active and semi-passive tags. The tag components can be enclosed within plastic, silicon, or even glass (e.g., between the layers (FIG. 1). Active and semi-passive RFID tags use internal batteries to power their circuits. An active tag also uses its battery to broadcast radio waves to a reader, where a semi-passive tag relies on the reader to supply its power for broadcasting. These tags contain more hardware than passive RFID tags and so are generally more expensive, but can be read over greater distances (greater than or equal to 100 feet (30.5 meters)). Additional batteries can increase the range to greater than or equal to 300 feet (90 meters). RFID tags broadcast over a portion of the electromagnetic spectrum. The exact frequency varies and can be chosen so as to avoid interference with other electronics or among other RFID tags and readers in the form of tag interference or reader interference. Passive RFID tags rely on the reader as their power source. Passive RFID tags can be read up to 20 feet (6 meters) away and generally have lower production costs.

RFID tags work by storing data in the RFID tags microchip that waits to be read. The tags antenna receives electromagnetic energy from an RFID reader's antenna and using power from its internal battery or power harvested from the reader's electromagnetic field, the tag sends radio waves back to the reader. The reader then picks up the tag's audio radio waves and interprets the frequencies as meaningful data. For the pallet described herein, an RFID tag can be embedded in an open space of the multiwall sheet of the top deck 32 (e.g., between the first wall and the second wall). As mentioned, the RFID tag can enable the owner of the pallet to track the location of the pallet for various purposes.

In an embodiment, an RFID tag can be embedded in the open space located between the first wall 38 and the second wall 40 to enable tracking of the pallet.

Possible resins that may be employed to form the various components of the pallet include, but are not limited to, thermoplastic and thermoset resins including oligomers, polymers, ionomers, dendrimers, copolymers such as graft copolymers, block copolymers (e.g., star block copolymers, random copolymers, etc.) and combinations comprising at least one of the foregoing. Examples of thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES), polyphenylene ether), polypropylene, polyphenylene oxide (e.g., polyphenylene oxide-polystryrene blends), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, polybutylene terephthalate, fluoropolymers (e.g., polyvinyl fluoride (PVF), polyvinylidene fluoride (PVDF), polyvinyl fluoride (PVF), fluorinated ethylene-propylene (FEP), polyethylenetetrafluoroethylene (ETFE)) and combinations comprising at least one of the foregoing.

More particularly, the resin used in pallet to make, e.g., the bottom deck 14, the supporting columns 16, the substrate 18 for the top deck 12 and the first wall 38 for the top deck 32, and the ribs 42 of the multiwall sheet 44 can include, but is not limited to, metal (e.g., aluminum, steel, and so forth), wood (e.g., oak, maple, cedar, ash, pine, particle board, and so forth), plastic (e.g., thermoplastic, thermoset, and so forth), and combinations comprising at least one of the foregoing. Examples of possible thermoplastic materials include polycarbonate resins (e.g., LEXAN* resins, commercially available from SABIC's Innovative Plastics business), polyphenylene oxide-polystyrene resins (e.g., NORYL* resins, commercially available from SABIC's Innovative Plastics business), polyetherimide resins (e.g., ULTEM* resins, commercially available from SABIC's Innovative Plastics business), polybutylene terephthalate-polycarbonate resins (e.g., XENOY* resins, commercially available from SABIC's Innovative Plastics business), copolyestercarbonate resins (e.g. LEXAN* SLX resins, commercially available from SABIC's Innovative Plastics business), polyethylene resins (e.g., high density polyethylene), polypropylene resins, and combinations comprising at least one of the foregoing resins. Even more particularly, the thermoplastic resins can include, but are not limited to, homopolymers and copolymers of a polycarbonate, a polyethylene, a polyetherimide, a polyphenylene ether, a polybutylene terephthalate, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

The resins for forming the pallet can include various additives ordinarily incorporated into thermoplastic compositions of this type, with the proviso that the additive(s) are selected so as to not significantly adversely affect the desired properties of the pallet, in particular, strength. Such additives can be mixed at a suitable time during the mixing of the components for forming the pallet. Exemplary additives include impact modifiers, fillers, reinforcing agents (e.g., reinforcing fibers), antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardant additives, and anti-drip agents. A combination of additives can be used, for example a combination of a heat stabilizer, flame retardant additives, and ultraviolet light stabilizer. In general, the additives are used in the amounts generally known to be effective. The total amount of additives (other than any impact modifier, filler, or reinforcing agents) is generally 0.001 wt. % to 5 wt. %, based on the total weight of the thermoplastic composition.

It is understood that the resins used to make the various components of the pallet are substantially free of flame retardant additives (i.e., no intentional addition of flame retardant additive was added to the resins). For example, as discussed above, it can be desirable for the pallets to contain essentially no flame retardant additives, for example, no chlorine and/or bromine flame retardants. "Substantially/ Essentially free of flame retardant" as used herein refers to resins materials produced without the intentional addition of flame retardant additives (e.g., chlorine, bromine, and/or chlorine or bromine containing materials). It is understood however that in facilities that process multiple products a certain amount of cross contamination can occur resulting in flame retardant additive levels (e.g., bromine and/or chlorine levels) typically on the parts per million by weight scale. With this understanding it can be readily appreciated that essentially free of flame retardant additives can be defined as having a flame retardant additive (e.g., bromine and/or chlorine) content of less than or equal to about 100 parts per million by weight (ppm), less than or equal to about 75 ppm, or less than or equal to about 50 ppm. When this definition is applied to the resin it is based on the total weight of resin composition for making the various components of the pallet. In other embodiments, although not required, a flame retardant additive can, optionally, be used in the material used to form the various components of the pallet. For example, a flame retardant additive can, optionally, be included in the top deck substrate or the top deck first wall of the multiwall sheet and/or in the bottom deck. It has become increasingly desirable that if a flame retardant additive system is used, it be non-halogenated. For example, in the pallets disclosed herein, the pallet can be free of polybrominated diphenyl ethers (e.g., decabromo diphenyl ether).

In one embodiment, the layer 20 of the top deck 12 and the second wall 40 of the top deck 32 can comprise a Composite Board material. The Composite Board material has a low heat release rate and low smoke density properties to provide flame retardant properties to the pallet that help prevent flame spread along the surface of the layer or the second wall. Use of the Composite Board material can provide an advantageous feature that an additional flame retardant material may not be necessary in the remaining portions of the pallet (e.g., the bottom deck, supporting columns, ribs, first wall, and substrate). It is to be understood that other locations for the Composite Board, in addition to the layer 20 and second wall 40, are contemplated (e.g., on a top surface of the bottom deck 14).

As previously discussed, the dual matrix composite comprises a first matrix formed from polymeric binder fibers and a second matrix formed from polyimide fibers. The reinforcing fibers can be metal fibers (e.g., stainless steel fibers), metallized inorganic fibers, metallized synthetic fibers, glass fibers (e.g., lime-aluminum borosilicate glass that is soda-free ("E" glass), A, C, ECR, R, S, D, or NE glasses), graphite fibers, carbon fibers, ceramic fibers, mineral fibers, basalt fibers, polymer fibers having a melt temperature at least 150° C. higher than the polyimide, or a combination comprising at least one of the foregoing. The reinforcing fibers generally have a modulus higher than 10 GigaPascals (GPa). In an embodiment, the reinforcing fibers are glass fibers, a compatible non-glass material, or a combination thereof. As used herein, the term "compatible non-glass material" refers to a non-glass material having at least surface adhesion and wetting properties similar to those of glass, which will allow for uniform dispersion with the glass fibers.

The reinforcing fibers can be provided in the form of monofilament or multifilament fibers; non-woven fibrous reinforcements such as continuous strand mat, chopped strand mat, tissues, papers and felts or the like. In an embodiment, the reinforcing fibers are discontinuous, in the form of single discrete fibers. Where glass fibers are used and are received in the form of chopped strand bundles, the bundles can be broken down into single fibers before the structure is formed. The discontinuous reinforcing fibers can be 5 to 75 millimeters (mm) in the longest dimension, specifically 6 to 60 mm, more specifically 7 to 50 mm, and still more specifically 10 to 40 mm in the longest dimension. In addition, the discontinuous reinforcing fibers can have a diameter of 5 to 125 micrometers (μm), specifically 10 to 100 micrometers. The polyimide fibers can be 5 to 75 millimeters (mm) in the longest dimension, specifically 6 to 60 mm, more specifically 7 to 50 mm, and still more specifically 10 to 40 mm in the longest dimension.

The polyimide fibers contribute one type of polymer to the dual polymer matrix. A wide variety of polyimides can be used, depending on the availability, melt temperature, and desired characteristics of the dual matrix composites. As used herein, "polyimides" is inclusive of polyetherimides and polyetherimide sulfones. In a specific embodiment, the polyetherimide comprise more than 1, specifically 10 to 1,000, or more specifically, 10 to 500 structural units, of formula (1)

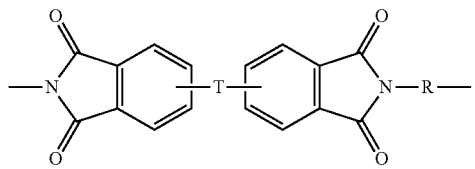

wherein T is —O— or a group of the formula —O—Z—O— wherein the divalent bonds of the —O— or the —O—Z—O— group are in the 3,3',3,4',4,3', or the 4,4' positions and Z is a divalent group that includes, but is not limited to, divalent moieties of formula (2)

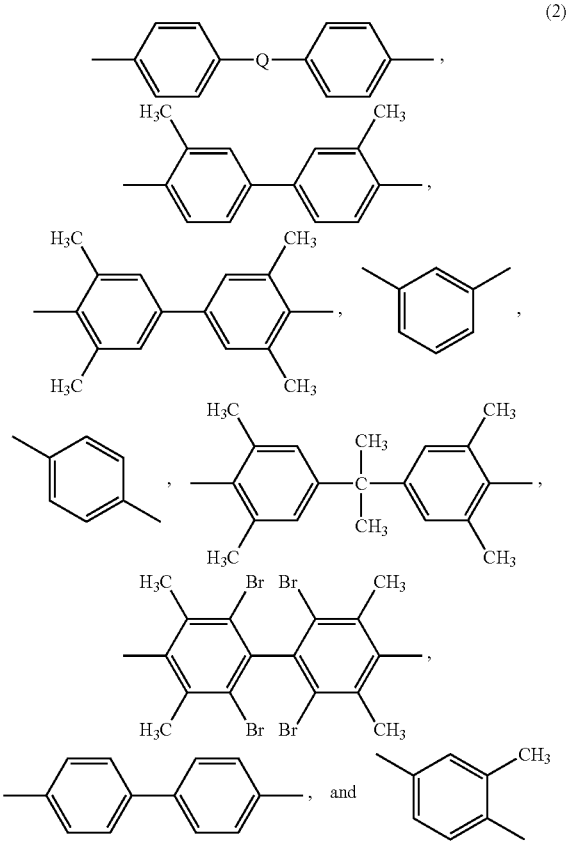

wherein Q is a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups as defined above; and wherein R is a divalent group of formula (3)

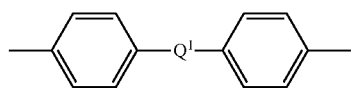

wherein Q is a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In another specific embodiment, the polyetherimide sulfones can comprise more than 1, specifically 10 to 1,000, or more specifically, 10 to 500 structural units of formula (4)

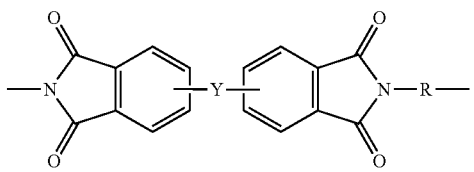

wherein Y is —O—, —SO$_2$—, or a group of the formula —O—Z—O— wherein the divalent bonds of the —O—, SO$_2$—, or the —O—Z—O— group are in the 3,3',3,4',4,3', or the 4,4' positions, wherein Z is a divalent group of formula (2) as defined above and R is a divalent group of formula (3) as defined above, provided that greater than 50 mole % of the sum of moles Y+moles R in formula (1) contain —SO$_2$— groups.

The polyetherimide and polyetherimide sulfones can be prepared by various methods, including, but not limited to, those disclosed in commonly assigned U.S. patent application Ser. No. 13/232,577, which is incorporated by reference herein in its entirety.

In an embodiment, the polyetherimide comprises structural units of formula (1) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is a divalent group of formula (5)

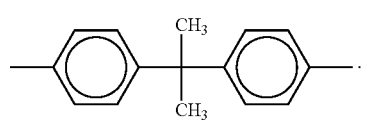

The polyetherimides and polyetherimide sulfones have a weight average molecular weight (Mw) of 5,000 to 80,000 Daltons. Weight average molecular weight can be measured by gel permeation chromatography, using a polystyrene standard. Representative polyetherimides are those produced under the ULTEM* trademark, including, but not limited to ULTEM* 1000 (number average molecular weight (Mn) 21,000 g/mole; Mw 54,000 g/mole; dispersity 2.5), ULTEM* 1010 (Mn 19,000 g/mole; Mw 47,000 g/mole; dispersity 2.5) and ULTEM* 9011 (Mn 19,000 g/mole; Mw 47,000 g/mole; dispersity 2.5) resin by SABIC's Innovative Plastics business.

The polymeric binder fibers form the first matrix and contribute to the formation of the porous mat. The polymeric binder fibers melt during formation of the porous mat to form the first matrix, and are therefore selected to have a melt temperature lower than the melt temperature of the polyetherimide. For example, the polymeric binder fibers can have a melt temperature that is at least 10° C. lower than the melt temperature of the polyimide fibers, specifically at least 20° C. lower, even more specifically at least 30° C.

lower than the melt temperature of the polyimide fibers. The polymeric binder fibers are further selected so as to be compatible with the polyimide fibers and the reinforcing fibers. The polymeric binder fibers are further selected so as to not contribute significantly to the heat release, optical smoke density, and/or combustion products toxicity of the dual matrix composite. Possible polymeric binder fibers that can meet these criteria include thermoplastic polyolefin blends, polyvinyl polymers, butadiene polymers, acrylic polymers, silicone polymers, polyamides, polyesters, polycarbonates, polyestercarbonates, polystyrenes, polysulfones, polyarylsulfones, polyphenylene ethers polyphenylene-sulphide, polyethers, polyetherketones, and polyethersulfones, or a combination thereof. In an embodiment, the polymeric binder fibers are formed from a polysiloxane-polyestercarbonate copolymer, polyester, polyester-polyetherimide blend, bicomponent fiber of any of the foregoing, or a combination thereof.

Prior to being formed into fibers, the polyimide and/or polymeric binder can be formulated with various additives ordinarily incorporated into polymer compositions of this type, with the proviso that the additives are selected so as to not significantly adversely affect the desired properties of the fibers. Exemplary additives include fillers, catalysts (for example, to facilitate reaction between an impact modifier and the polyester), antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

In an embodiment, certain flame retarding agents are excluded from the compositions as discussed above, in particular flame retardant additives s that include phosphorus, bromine, and/or chlorine. Non-brominated and non-chlorinated phosphorus-containing flame retardant additives can be used in certain applications for regulatory reasons, for example organic phosphates. In another embodiment, inorganic flame retardant additives are excluded from the compositions, for example salts of $C_{1-16}$ alkyl sulfonate salts such as potassium perfluorobutane sulfonate (Rimar salt), potassium perfluorooctane sulfonate, tetraethyl ammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like.

The polyimide and polymeric binder are formed into fibers by various methods. The polyimide and polymeric binder fibers, together with the reinforcing fibers are combined to provide a composition for the production of a porous mat. Consolidation of the porous mat under heat and pressure provides a dual matrix composite that can then be thermoformed to provide articles useful in the manufacture of pallets.

In particular, a composition for the manufacture of a porous, compressible mat includes a combination of reinforcing fibers; polyimide fibers; and polymeric binder fibers wherein the polymeric binder fibers form the first matrix and have a melting point lower than the polyimide fibers. The composition is thermally treated to selectively melt and flow the polymeric binder fibers such that the polymeric binder fibers adhere adjoining fibers together upon cooling, to produce a mat containing a network of discontinuous, randomly oriented reinforcing fibers and polyimide fibers bonded together using melted fibers of the polymeric binder fibers. The porous mat is then thermally treated under pressure to melt and flow the polyimide fibers such that the thermoplastic composition adheres adjoining fibers together upon cooling. In this way, an interconnected network of reinforcing fibers and a dual matrix composite (i.e., first matrix formed from polymeric binder fibers and second matrix formed from polyimide fibers) is formed. The network so prepared has high loft and uniformity across the structure.

A method for forming a porous mat according includes forming a layer comprising a suspension of the combination of reinforcing fibers; polyimide fibers; and a polymeric binder fibers in a liquid, for example an aqueous solvent; at least partially removing the liquid from the suspension to form a web; heating the web under conditions sufficient to remove any remaining aqueous solvent from the web and to melt the polymeric binder fibers but not the polyimide; and cooling the heated web to form the porous mat, wherein the porous mat comprises a network of the reinforcing fibers and the polyimide fibers in a matrix of the polymeric binder fibers.

The reinforcing fibers, polyimide fibers, and polymeric binder fibers are combined in a liquid medium to form a suspension, wherein the fibers are substantially uniformly suspended and distributed throughout the medium. In one embodiment, the combining is performed by introducing the fibers into an aqueous medium to provide a suspension, which can be a slurry, dispersion, foam, or emulsion. The combining is performed so as to render the fibers substantially evenly dispersed in the aqueous medium, and can use agitation to establish and maintain the dispersion of these components. The suspension can further comprise additives such as dispersants, buffers, anti-coagulants, surfactants, and the like, and combinations comprising at least one of the foregoing, to adjust or improve the flow, dispersion, adhesion, or other properties of the suspension. Specifically, the suspension can be a foamed suspension comprising the fibers, water, and a surfactant. The percentage by weight of solids (wt. %) of the suspension can be from 1 to 99 wt. %, specifically 2 to 50 wt. %. Additives can be present in an amount effective for imparting desired properties of foaming, suspension, flow, and the like.

The suspension can be prepared in batch mode, and used directly or stored for later use, or alternatively be formed in a continuous manufacturing process wherein the components are each combined to form the suspension at a time just prior to the use of the suspension.

To form the porous mat, the suspension is applied as a slurry to a porous surface, for example a wire mesh, and the liquid and suspended components too small to remain on the porous surface are removed through the porous surface by gravity or use of vacuum, to leave a layer comprising a dispersion of fibers on the porous surface. In an exemplary embodiment, the porous surface is a conveyor belt having pores, and of dimensions suitable to provide, after application of the dispersed medium and removal of liquid, a fibrous mat having a width sufficient to meet a dimension of the pallet (e.g., 2 meters) and a continuous length. The dispersed medium can be contacted to the porous surface by distribution through a head box, which provides for application of a coating of the dispersed medium having a substantially uniform width and thickness over the porous surface. Typically, vacuum is applied to the porous surface on a side opposite the side to which the dispersed medium is applied, to draw the residual liquid and/or small particles through the porous surface, thereby providing a web in substantially dried form. In an embodiment, the layer is dried to remove moisture by passing heated air through the layer mat.

Upon removal of the excess dispersed medium and/or moisture, the non-bonded, web comprising the fibers is thermally treated to form a porous mat. In an embodiment, the web is heated by passing heated air through the web in a furnace. In this way, the web can be dried using air heated at a temperature of greater than or equal to, e.g., 100° C. under a flow of air. The heating temperature is selected to substantially soften and melt the polymeric binder fibers, but not the polyimide, for example at a temperature from 130 to 170° C. In an embodiment, the heating comprises heating in an oven at a temperature from 130 to 150° C., then infrared heating at a temperature from 150 to 170° C. During heating of the web, the polymeric binder fibers melt and flow to form a common contact (e.g., a bridge) between two or more of the reinforcing and polyimide fibers, and forms an adhesive bond with the fibers upon cooling to a non-flowing state, thereby forming the porous mat.

The porous mat comprises a network of the reinforcing fibers and the polyimide fibers; and a first matrix deposited on the network comprising melted and cooled polymeric binder fibers, wherein the polymeric binder fibers have a melt temperature lower than the polyimide fibers. The porous mat can have an areal weight of 90 to 500 grams per square meter (g/m$^2$). Alternatively, or in addition, the porous mat has a porosity of greater than 0%, more particularly 5% to 95%, and still more particularly 20% to 80% by volume.

As previously described, the dual matrix composite is formed from the porous mat, by heating and compressing the porous mat under conditions sufficient to melt the polyimide fibers and consolidate the network; and cooling the heated, compressed mat under pressure to form the dual matrix composite comprising a network comprising reinforcing fibers; and a first matrix comprising melted and cooled polymeric binder fibers and a second matrix comprising melted and cooled polyimide fibers, wherein the polymeric binder fibers have a melt temperature lower than the polyimide fibers.

When forming the second matrix, heating is at a temperature effective to soften the polyimide fibers, for example a temperature of 300 to 385° C., specifically 330 to 365° C., and a pressure of 5 to 25 bar, specifically 8 to 15 bar. During heating of the porous mat, the polyimide fibers soften and can flow to form a common contact (e.g., a bridge) between two or more of the reinforcing fibers, and form an adhesive bond with the fibers upon cooling to a non-flowing state, thereby forming the dual matrix composite. Heat-treating and compression can be by a variety of methods, for example using calendaring rolls, double belt laminators, indexing presses, multiple daylight presses, autoclaves, and other such devices used for lamination and consolidation of sheets so that the polyimide can flow and wet out the fibers. The gap between the consolidating elements in the consolidation devices may be set to a dimension less than that of the unconsolidated web and greater than that of the web if it were to be fully consolidated, thus allowing the web to expand and remain substantially permeable after passing through the rollers. In one embodiment, the gap is set to a dimension 5% to 10% greater than that of the web if it were to be fully consolidated. It may also be set to provide a fully consolidated web that is later re-lofted and molded to form particular articles or materials. A fully consolidated web means a web that is fully compressed and substantially void free. A fully consolidated web would have less than 5% void content and have negligible open cell structure.

In an advantageous feature, the dual matrix composite has a minimum degree of loft of greater than or equal to three. In another advantageous feature, the loft of the dual matrix composite is within one sigma, over the entirety of the dual matrix composite. Alternatively, or in addition, the loft of the dual matrix composite is within 30%, over the entirety of the dual matrix composite. Loft can be understood as the expansion that the dual matrix composite sheet undergoes as it is reheated without pressure above the melt temperature of the polyimide (e.g., polyetherimide), compared to the thickness of the fully consolidated sheet. It indicates the degree of glass fiber attrition that occurred during consolidation, which provides an indication of mechanical strength and formability. Manufacturing cycle time of the dual matrix composites is shortened considerably, from several hours down to minutes.

The porosity of the dual matrix composite is generally less than about 10 volume % or is less than about 4 volume % of the porosity of the porous mat, specifically less than about 3 volume %, more specifically less than about 2 volume %.

In an embodiment, a dual matrix composite includes a network comprising reinforcing fibers selected from metal fibers, metallized inorganic fibers, metallized synthetic fibers, glass fibers, graphite fibers, carbon fibers, ceramic fibers, mineral fibers, basalt fibers, polymer fibers having a melt temperature at least 150° C. higher than the polyimide, and combinations thereof; and a dual matrix comprising a first matrix comprising melted and cooled polymeric binder fibers and a second matrix comprising melted and cool polyimide fibers, wherein the polymeric binder has a melt temperature lower than the polyimide, and wherein the dual matrix composite has a minimum degree of loft of greater than or equal to three and the loft of the dual matrix composite is within 30% over the entirety of the dual matrix composite. In an embodiment, the dual matrix composite does not include a perfluoroalkyl sulfonate salt, a fluoropolymer encapsulated vinylaromatic copolymer, potassium diphenylsulfone-3-sulfonate, sodium trichlorobenzenesulfonate, or a combination comprising at least one of the foregoing flame retardant additives.

The dual matrix composite or layered structure prepared therefrom can be rolled, folded, or formed into sheets. The composite can be cut or rolled to an intermediate form. The cut dual matrix composite and/or the layered structure can be molded and expanded to form an article of a desired shape, for use in manufacture of further articles. The intermediate rolled, folded, or sheeted dual matrix composite or layered structure can further be molded into an article of a suitable shape, dimension, and structure for use in further manufacturing processes to produce further articles.

In embodiments where the top deck comprises a multiwall sheet, any number of walls that will provide the desired properties can be used. A multiwall sheet generally comprises at least two walls and ribs disposed therebetween, specifically, greater than or equal to three walls, more specifically, greater than or equal to four walls, even more specifically, greater than or equal to five walls, and yet more specifically, greater than or equal to ten walls. Ribs can be disposed between any two adjacent walls. The ribs can be any shape that will provide the desired properties for the multiwall sheet (e.g., stiffness and/or structural integrity), for example, linear or curved. A multiwall sheet can be formed from various polymer processing methods, such as extrusion or injection molding, if produced as a unitary structure. Continuous production methods, such as extrusion, generally offer improved operating efficiencies and greater production rates than non-continuous operations, such as injection molding. Specifically, a single screw extruder can be employed to extrude a polymer melt (e.g., polycarbonate, such as LEXAN*, commercially available from SABIC's Innovative Plastics business). The polymer melt is fed to a profile die capable of forming an extrudate having a cross-section. The multiwall sheet travels through a sizing apparatus (e.g., vacuum bath comprising sizing dies) and is then cooled below its glass transition temperature (e.g., for polycarbonate, about 297° F. (147° C.)).

After the multiwall sheet has cooled, it can be cut to the desired length utilizing, for example, an extrusion cutter such as an indexing in-line saw. Once cut, the multiwall sheet can be subjected to secondary operations before packaging. Exemplary secondary operations can comprise annealing, printing, attachment of fastening members, trimming, further operations, and/or any other desirable processes. The size of the extruder, as measured by the diameter of the extruder's screw, is based upon the production rate desired and calculated from the volumetric production rate of the extruder and the cross-sectional area of the panel. The cooling apparatus can be sized (e.g., length) to remove heat from the extrudate in an expeditious manner without imparting haze.

Coextrusion methods can also be employed for the production of the multiwall sheet. Coextrusion can be employed to supply different polymers to any portion of the multiwall sheet's geometry to improve and/or alter the performance of the sheet and/or to reduce raw material costs. One skilled in the art would readily understand the versatility of the process and the myriad of applications in which coextrusion can be employed in the production of multiwall sheets.

The dual matrix composite enables the pallet to pass the flammability requirements set forth in UL 2335 (Second Edition, Jul. 28, 2010), second edition. UL 2335 (Second Edition, Jul. 28, 2010) requires a determination of if sprinklers systems can control fires in stacks of empty pallets (a.k.a. "the idle test") or in stacks of pallets storing commodities in rack storage arrangements (a.k.a. "the commodity test"). Reported values include: 1) the number of activated sprinkler heads and if flame spread progressed to the edges of the idle stack ("idle test"), and 2) a classification rank based on various heat release parameters ("commodity test") The pallets described herein with the Composite Board can pass the requirements set forth in UL 2335 (Second Edition, Jul. 28, 2010). When direct flame or indirect heat is applied to the pallet, the layer and/or second wall comprising Composite Board expands to form a char protective layer and protect the other components of the pallet from damage from fire and/or exposure to flames and heat. This expansion under flames or heat is often referred to as "loft" when forming the material using heat. The mechanism for loft involves compressed glass fibers expanding (e.g., straightening out) when heat is applied. The heat can either soften the polymeric component, or destroy it outright in the case of an open flame, to the point where the polymeric component cannot prevent the compressed glass strands from "unfolding" or straightening. This process causes a resin-poor surface to form. With certain types of char-forming plastics used as the polymer component(s), this surface can be very resistant to spreading flames and act as an insulator to material below that surface. Due to the glass component and the mechanism for lofting under heat and flame, the rate of heat release for these composites (e.g., the Composite Board as described herein) can be much lower than a similar weight or thickness of other solid polymeric materials.

The pallets described herein are further illustrated by the following non-limiting examples.

EXAMPLES

Example 1

Results from the ASTM E84-07b test demonstrate the desirable reaction-to-fire aspects of the Composite Board material (i.e., ULTEM* 1000 resin) as the primary polymeric component. In the ASTM E84-07b tests, a sample of approximately 21 inches wide by 24 feet long is exposed to methane flames approximately 4.5 feet long. The sample is held in a "ceiling position", with the flames applied underneath. The Composite Board material had a flame spread of 0, which is comparable to non-flammable cement board under the same conditions. The material also remained in the ceiling position and within the flames throughout the 10-minute test duration. Maintaining structural integrity during this larger-scale flame test is an important attribute, since the dual matrix composite will also be protecting the pallets in the UL 2335 (Second Edition, Jul. 28, 2010) test, not just providing a low flame spread surface.

In one embodiment, a pallet comprises: a top deck comprising a substrate having a first surface and a second surface, wherein the substrate comprises a first plastic material; and a layer disposed on the second surface of the substrate, wherein the layer comprises a composition comprising reinforcing fibers, polyimide fibers, and polymeric binder fibers, wherein the polymeric binder fibers have a melting point that is lower than the polyimide fibers; a bottom deck (e.g., comprising a second plastic material); and supporting columns disposed between the second surface and the bottom deck.

In another embodiment, a pallet comprises: a top deck comprising a multiwall sheet, wherein the multiwall sheet comprises a first wall, a second wall, and ribs disposed between the first wall and the second wall, wherein the first wall and ribs comprise a first thermoplastic material and wherein the second wall comprises a matrix layer comprising a dual matrix composite comprising a first matrix, a second matrix, and a network of fibers, wherein the network of fibers comprises polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers; a bottom deck (e.g., comprising a second thermoplastic material); and supporting columns disposed between the second wall and the bottom deck.

In another embodiment, a method of making a pallet comprises: forming a top deck comprising a multiwall sheet, wherein the multiwall sheet comprises a first wall, a second wall, and ribs disposed between the first wall and the second wall, wherein the first wall and ribs comprise a first plastic material and wherein the second wall comprises a matrix layer comprising a dual matrix composite comprising a first matrix, a second matrix, and a network of fibers, wherein the network of fibers comprise polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers; forming a bottom deck (e.g., comprising a second plastic material); forming supporting columns between the second wall and the bottom deck.

In still another embodiment, a method of making a pallet comprises: forming a pallet comprising a top deck comprising a multiwall sheet, wherein the multiwall sheet comprises a first wall, a second wall, and ribs disposed between the first wall and the second wall, wherein the first wall and ribs comprise a first plastic material and wherein the second wall comprises a matrix layer comprising a composition comprising reinforcing fibers, polyimide fibers, and polymeric binder fibers, wherein the polymeric binder fibers have a melt temperature lower than the polyimide fibers; a bottom deck comprising a second plastic material; supporting columns disposed between the second wall and the bottom deck; and embedding a radio frequency identification tag in the top deck.

In yet another embodiment, a pallet comprises: a top deck comprising a substrate having a first surface and a second surface, and wherein the top deck comprises a deck material selected from the group consisting of metal, wood, plastic, and combinations comprising at least one of the foregoing; a bottom deck; and supporting columns are disposed between the second surface and the bottom deck; wherein the pallet passes the idle test and the commodities test as set forth in UL 2335 (Second Edition, Jul. 28, 2010).

In the various embodiments, (i) the second wall further comprises a plastic layer located on a side of the second wall adjacent the ribs; and/or (ii) the reinforcing fibers are selected from the group consisting of metal fibers, metallized inorganic fibers, metallized synthetic fibers, synthetic fibers, glass fibers, graphite fibers, carbon fibers, ceramic fibers, mineral fibers, basalt fibers, polymer fibers having a melt temperature at least 150° C. higher than polyimide, and combinations comprising at least one of the foregoing; and/or (iii) the first plastic material and/or the second plastic material are selected from the group consisting of the group consisting of polyetherimide, polycarbonate, acrylonitrile-butadiene styrene, acrylic-styrene-acrylonitrile, polyphenylene oxide, polyurethane, polyester, polyethylene terephthalate, polypropylene, polyethylene; and/or (iv) the first plastic material and the second plastic material are substantially free from a flame retardant additive; and/or (v) the pallet is free of polybrominated diphenyl ether; and/or (vi) the pallet is free of decabromodiphenyl ether; and/or (vii) the polyimide fibers comprise polyetherimide fibers; and/or (viii) the reinforcing fibers comprise glass fibers; and/or (ix) the pallet passes the idle test and the commodities test as set forth in UL 2335 (Second Edition, Jul. 28, 2010); and/or (x) the top deck further comprises a radio frequency identification tag; and/or (xi) the radio frequency identification tag is located between the first wall and the second wall; and/or (xii) the second wall expands when heat is applied to the pallet; and/or (xiii) further comprising embedding a radio frequency identification tag into the top deck between the first wall and the second wall; and/or (xiv) the substrate comprises a plastic material; and/or (xv) the substrate comprises the deck material; and/or (xvi) the deck material is in the form of a layer on the second surface; and/or (xvii) the deck material is selected from the group consisting of polyetherimide, polycarbonate, acrylonitrile-butadiene styrene, acrylic-styrene-acrylonitrile, polyphenylene oxide, polyurethane, polyester, polyethylene terephthalate, polypropylene, polyethylene, and combinations comprising at least one of the forgoing; and/or (xviii) the substrate, and/or the bottom deck, and/or the supporting columns are substantially free from a flame retardant additive; and/or (xix) the deck material further comprises reinforcing fibers; and/or (xix) the layer can extend across greater than or equal to 80% of the second surface.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

"Melt temperature" as used herein refers to the melt temperature of crystalline polymers, or the glass transition or softening temperature of amorphous polymers.

Compounds are described herein using standard nomenclature. A dash ("-") that is not between two letters or symbols is used to indicate a point of attachment for a substituent. For example, —CHO is attached through the carbon of the carbonyl (C=O) group. As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom;

"alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

What is claimed is:

1. A pallet, comprising:
   a top deck comprising a multiwall sheet, wherein the multiwall sheet comprises a first wall, a second wall, and ribs disposed between the first wall and the second wall, wherein the first wall and ribs comprise a first thermoplastic material and wherein the second wall comprises a matrix layer comprising a dual matrix composite comprising a first matrix, a second matrix, and a network of fibers, wherein the network of fibers comprises polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers;
   a bottom deck, wherein the bottom deck comprises a second thermoplastic material; and
   supporting columns disposed between the second wall and the bottom deck.

2. The pallet of claim 1, wherein the reinforcing fibers are at least one of metal fibers, metallized inorganic fibers, metallized synthetic fibers, synthetic fibers, glass fibers, graphite fibers, carbon fibers, ceramic fibers, mineral fibers, basalt fibers, and polymer fibers having a melt temperature at least 150° C. higher than polyimide.

3. The pallet of claim 2, wherein the reinforcing fibers comprise glass fibers.

4. The pallet of claim 1, wherein the top deck further comprises a radio frequency identification tag.

5. The pallet of claim 4, wherein the radio frequency identification tag is located between the first wall and the second wall.

6. The pallet of claim 1, wherein the second wall further comprises a plastic layer located on a side of the second wall adjacent the ribs.

7. The pallet of claim 1, wherein the first thermoplastic material is at least one of polyetherimide, polycarbonate, acrylonitrile-butadiene styrene, acrylic-styrene-acrylonitrile, polyphenylene oxide, polyurethane, polyester, polyethylene terephthalate, polypropylene, and polyethylene.

8. The pallet of claim 1, wherein the first thermoplastic material and the second thermoplastic material are substantially free from a flame retardant additive.

9. The pallet of claim 1, wherein the pallet is free of polybrominated diphenyl ether.

10. The pallet of claim 1, wherein the pallet is free of decabromodiphenyl ether.

11. The pallet of claim 1, wherein the polyimide fibers comprise polyetherimide fibers.

12. The pallet of claim 1, wherein the pallet passes the idle test and the commodities test as set forth in UL 2335 (Second Edition, Jul. 28, 2010).

13. A method of making a pallet, comprising:
   forming a top deck comprising a multiwall sheet, wherein the multiwall sheet comprises a first wall, a second wall, and ribs disposed between the first wall and the second wall, wherein the first wall and ribs comprise a first thermoplastic material and wherein the second wall comprises a matrix layer comprising a dual matrix composite comprising a first matrix, a second matrix, and a network of fibers, wherein the network of fibers comprise polyimide fibers, polymeric binder fibers, and reinforcing fibers; wherein the first matrix comprises melted and cooled polymeric binder and the second matrix comprises melted and cooled polyimide, wherein the polymeric binder fibers have a melt temperature lower than the polyimide fibers;
   forming a bottom deck, wherein the bottom deck comprises a second thermoplastic material;
   forming supporting columns between the second wall and the bottom deck.

14. The method of claim 13, wherein the reinforcing fibers are at least one of metal fibers, metallized inorganic fibers, metallized synthetic fibers, synthetic fibers, glass fibers, graphite fibers, carbon fibers, ceramic fibers, mineral fibers, basalt fibers, and polymer fibers having a melt temperature at least 150° C. higher than polyimide.

15. The method of claim 13, wherein the second wall expands when heat is applied to the pallet.

16. The method of claim 13, further comprising embedding a radio frequency identification tag into the top deck between the first wall and the second wall.

17. The method of claim 13, wherein the pallet passes the idle test and the commodities test as set forth in UL 2335 (Second Edition, Jul. 28, 2010).

\* \* \* \* \*